UNITED STATES PATENT OFFICE.

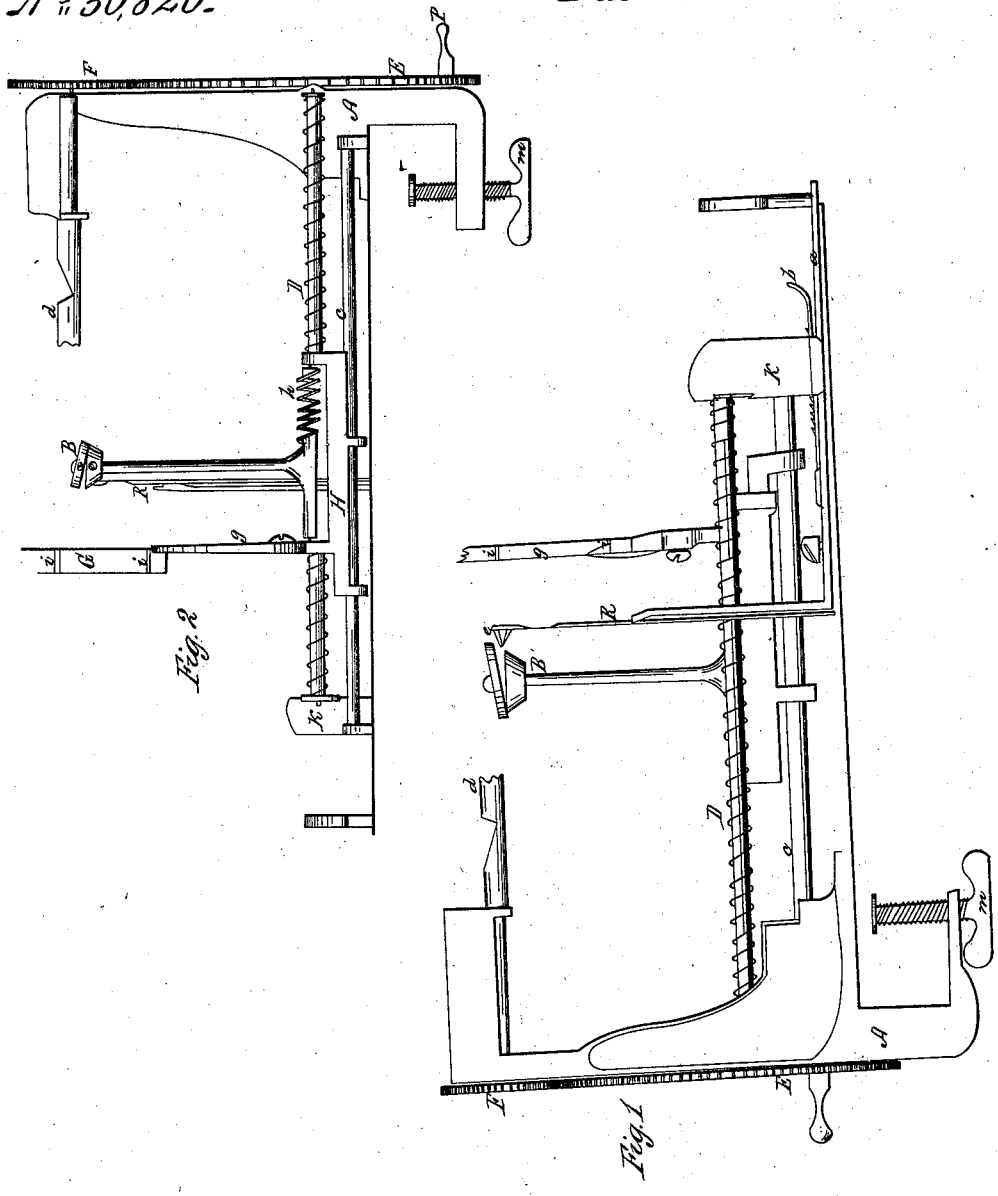

HENRY ST. I. HILSMAN, OF MADISON, GEORGIA.

PEACH PARER AND CUTTER.

Specification of Letters Patent No. 30,820, dated December 4, 1860.

*To all whom it may concern:*

Be it known that I, HENRY ST. I. HILSMAN, of Madison, in the county of Morgan and State of Georgia, have invented certain new and useful Improvements in Peach-Parers; and I do hereby declare that the following is a full, clear, and exact description of the same, reference being had to the accompanying drawings and to the letters of reference marked thereon, in which—

Figures 1 and 2 are side elevations.

The nature of my invention consists in the employment of the double knife and also in the combination and arrangement of such devices as will be hereinafter fully set forth.

To enable others skilled in the art to make and use my machine, I will proceed to describe its construction and operation.

(A) represents the frame of the machine, which is provided with a thumb screw (m) for the purpose of fastening it to a table.

(D) is a screw shaft revolved by means of the cog wheel (E).

(C) represents a rod, and (H) a carriage which slides upon rod (C).

(B) is the paring knife. The stalk of knife (B) is connected to the carriage (H) in such a manner that it will accommodate itself to the size of the peach.

(h) is a coiled spring for the purpose of pressing the knife (B) against the peach.

(G) represents a double knife, or more properly speaking two knives, which should be about a quarter of an inch apart and braced together by means of the connecting pieces (i i). The object in using this double knife is more effectually to take the fruit from the stone.

(g) represents a spring placed behind the knives (G) as fully shown in Fig. 2.

(d) represents a hollow holder, with its end serrated, as seen in the figure. The opposite end of this holder is secured to the cog wheel (F), which is operated by means of the cog wheel (E).

(k) is an upright through which passes the slide (a). Said slide is kept at any place desired by the serrated spring (f).

(R) represents an upright spring which is secured at the end of slide (a) as fully shown in Fig. 1.

(e) is a cone-shaped holder. Immediately below this holder the spring is provided with a cutting surface for the purpose of shaving off the rough ends of the peach.

The operation of my machine is as follows: The slide (a) being adjusted according to the length of the peach, and the peach inserted between the two holders, motion is given the machine by means of crank (P). The screw shaft as it revolves forces the paring knife across the fruit and pares it. The double knife being also attached to the carriage, follows immediately, and slices it, while the remaining knife coming after scrapes the stone, thus effectually taking every particle of the peach from it.

The great difficulty experienced with peach parers hitherto has been that they have failed to separate the fruit from the stone, and in paring a great quantity much loss would necessarily be felt. It is, however, believed that the employment of the double knife as here described will entirely obviate this difficulty. By removing the double knife and screwing on a single one the machine may be used as an apple parer and slicer.

Having thus fully described my invention, what I claim and desire to secure by Letters Patent is—

1. The double knife (G), the same being constructed and operated substantially as and for the purpose set forth.

2. The arrangement of slide (a) serrated spring (f), holders (d) and (e), and spring (g) when all shall be used conjointly, in the manner described.

HENRY ST. I. HILSMAN.

Witnesses:
T. H. ALEXANDER,
WM. A. HUGHES.